United States Patent [19]

Lawrence

[11] Patent Number: 4,567,491
[45] Date of Patent: Jan. 28, 1986

[54] PINCH ROLLER ASSEMBLY

[75] Inventor: James Lawrence, Irvine, Calif.

[73] Assignee: Sanders Associates, Inc., Nashua, N.H.

[21] Appl. No.: 633,171

[22] Filed: Jul. 23, 1984

[51] Int. Cl.$^4$ ............................................. G01D 15/28
[52] U.S. Cl. .................................... 346/136; 226/179; 226/181; 400/636; 400/638
[58] Field of Search ........................... 346/136, 139 R; 226/194, 179, 181, 186, 187; 400/639, 638, 637

[56] References Cited

U.S. PATENT DOCUMENTS 1,150,345  8/1915  Dennis ................................. 400/638
4,514,740  4/1985  Fujiwara ......................... 346/136 X Primary Examiner—Joseph W. Hartary
Attorney, Agent, or Firm—Louis Etlinger; Wm. F. Porter, Jr.

[57] ABSTRACT

An easily adjustable and automatically aligning pinch roller assembly for use in a graphics plotter. A movable carriage hangs from a supplemental inverted T-shaped track below the main carriage track of the plotter. The pinch roller is pivotally attached to an arm from the carriage. A leaf spring on the carriage pulls the carriage loosely into positional alignment with the pinch roller aligned with the drum while allowing translational movement easily. A second bias spring urges the pinch roller down and the carriage into gripping engagement with the supplemental track with sufficient force to prevent translational movement thereof. A release bar holds the pinch roller off the drum and releases the gripping force to allow the carriage to be slid for adjustment.

5 Claims, 5 Drawing Figures ns of the pinch roller and the drum must be kept in perfect parallel alignment.

PINCH ROLLER ASSEMBLY

BACKGROUND OF THE INVENTION

The present invention relates to graphics plotters including a pinch roller drive on a drum and, more particularly, to an improved pinch roller assembly whereby the pinch roller is mounted to a carriage slideably mounted on a supplemental track below the main track for easy translational movement and first bias means are provided for gently urging the carriage into alignment and second bias means are provided for urging the pinch roller down and the carriage to grip the supplemental track with sufficient force to prevent further translational movement. A releasable bar is pivotally mounted to the carriage for selectively holding the pinch roller off the drum and to release the gripping force on the supplemental track during translational adjustment of the assembly.

Graphics plotters employing a drum with pinch roller drive are well known in the art. In such devices, a rotatable drum is bi-directionally movable by a motor drive assembly to move a strip of paper or other writing medium beneath a pen or other writing device. The pen is mounted to a pen carriage assembly moving at right angles to the strip of paper's movement across the drum in response to a signal. Between the movements of the pen carriage and the drum, the two right angular directions of movement required are affected such that the plot is created on the paper. To move the paper with the drum, a pair of pinch rollers are provided with one adjacent each edge of the paper urging the paper against the surface of the drum and rolling along the paper at the point of contact with the drum as the drum is turned so that the paper is moved along with the drum. In order for no tangential forces to be created on the paper tending to buckle it or move it out of its proper alignment with the drum, the rotational axes of the pinch rollers and the drum must be kept in perfect parallel alignment. Additionally, since the width of the paper employed may change, the pinch rollers are usually made adjustable as to their position along the surface of the drum. Unfortunately, to date, this has created two mutually exclusive conditions. To maintain the pinch rollers in their proper alignment, the carriage mounting to the carriage track has been with such close tolerance and with such biasing force that translational movement of the pinch roller carriage has been almost impossible and accomplishable only through the application of an excessively high longitudinal translational force thereagainst.

Wherefore, it is the object of the present invention to provide a pinch roller assembly which automatically attains and maintains the desired positional alignment between the pinch rollers and the drum while, at the same time, providing for easy translational adjustment of the rollers with a minimum of force.

SUMMARY

The foregoing objective has been accomplished in a graphics plotter having a rotatable drum, a pinch roller for holding a writing medium against the drum for longitudinal movement thereby, and a carriage track disposed above and parallel to the drum for supporting a pen block carriage for traverse movement by the improvement of the present invention comprising: a supplemental track carried by the carriage track and extending downward therefrom, the supplemental track being an inverted T-shape in cross section; a pinch roller carriage having a pair of spaced, parallel side members, each having a pair of facing L-shaped gripping members extending upward therefrom, the gripping members being adapted to fit loosely about the supplemental track whereby the pinch roller carriage hangs therefrom and is easily slideable traversely along the supplemental track; a first pivot pin disposed between the side members and parallel thereto at about the location of the ones of the gripping members closest to the drum; a pivot arm pivotally mounted on the first pivot pin and extending between the side members, one end of the pivot arm terminating above the drum in a yoke having a pair of parallel spaced side pieces lying in planes normal to the pivot pin, the other end of the pivot arm extending past the portion of the supplemental track furthest from the drum; a second pivot pin disposed between the side pieces and normal thereto; a pinch roller mounted on the second pivot pin for rotational movement; first bias means carried by the pinch roller carriage for pushing against the supplemental track to urge the gripping members closest to the drum against the edge of the supplemental track closest to the drum whereby the second pivot pin is placed in longitudinally parallel alignment with the longitudinal axis of the drum, the urging being with a force sufficiently small to allow the easy translational sliding of the pinch roller carriage along the supplemental track; second bias means operably connected between the pinch roller carriage and the pivot arm for urging the pinch roller down against the surface of the drum and the gripping members into pinching engagement with the supplemental track with sufficient force to prevent translational movement of the pinch roller carriage; and, bias release means for selectively holding the pinch roller off the drum and release the pinching engagement against the force of the second bias means to allow translational movement of the pinch roller carriage and thereby the position of the pinch roller along the length of the drum.

DESCRIPTION OF THE PREFERRED EMBODIMENT

Figure 5:
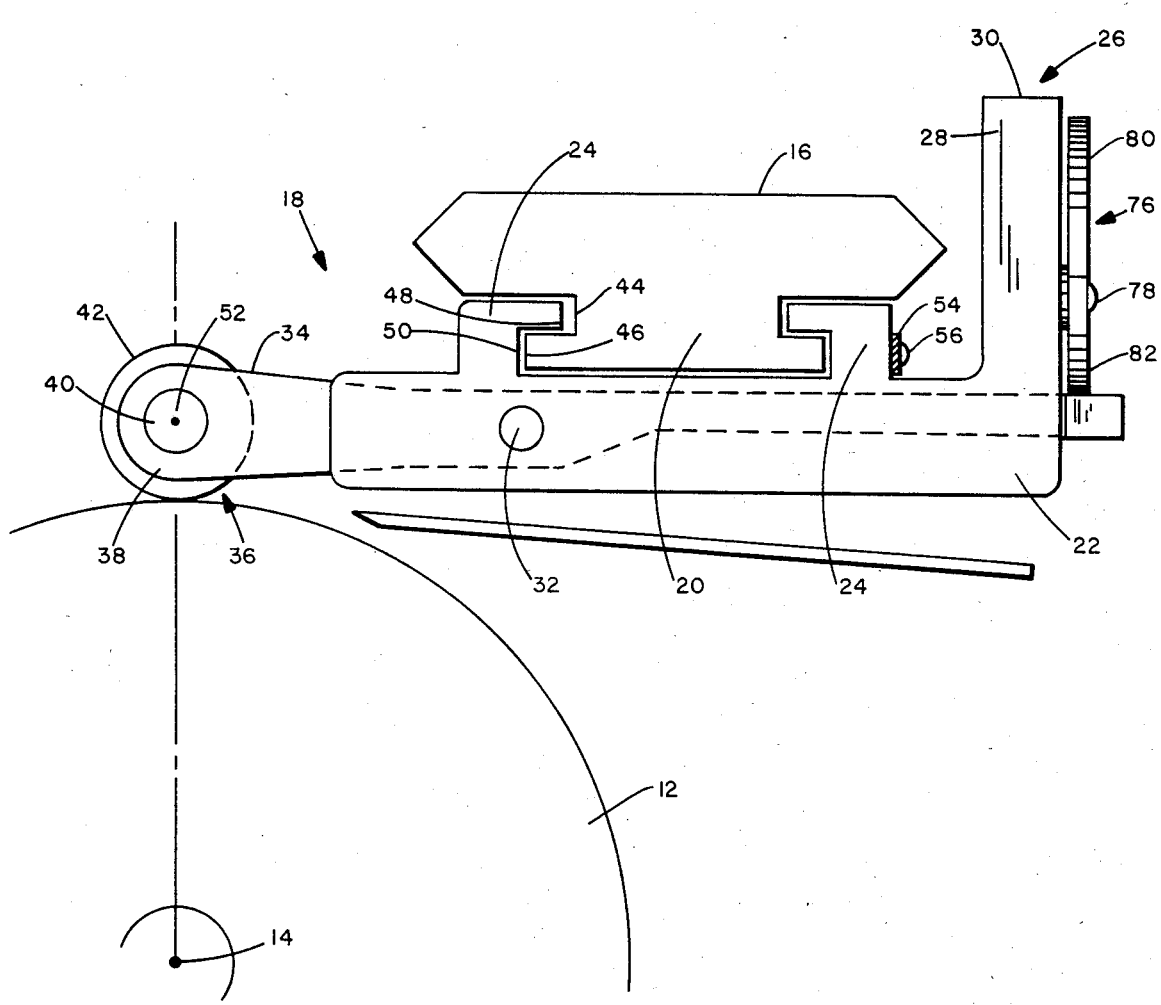
FIG. 5 is a side elevation of the pinch roller assembly of the present invention in its released position.

Referring now to the drawings, a portion of a graphics plotter incorporating the present invention is generally indicated as 10. Plotter 10 includes a drum 12 having a longitudinal axis 14. A pen carriage track 16 is positioned above, behind, and parallel to the drum 12. A pen block carriage (not shown) moves along the carriage track 16 during operation of the plotter 10 to move a pen traversely across the moving strip of writing medium. The pinch roller assembly of the present invention is generally indicated as 18. To mount the pinch roller assembly 18, a supplemental track 20 is incorporated into the carriage track 16. As will be recognized, supplemental track 20 could also be a separate piece attached to the carriage track 16 as by bolts, or the like. Supplemental track 20 is generally an inverted T-shape in cross section. Pinch roller assembly 18 includes a pair of parallel side members 22 which are in parallel spaced relationship, each having a pair of facing L-shaped gripping members 24 adapted to fit loosely about the cross arms of the T-shaped supplemental track 20 as best seen in the side views of FIGS. 3 and 5. As best seen in FIG. 5, the two L-shaped gripping members 24 on each side member 22 define a pair of parallel, generally T-shaped slots into which the T-shaped supplemental track 20 fits with sufficient clearance that the side members 22 can hang from the supplemental track 20 and be moved easily longitudinally along the supplemental track 20.

The two parallel side members 22 are joined at the end furthest from the drum 12 by a generally U-shaped member 26 comprising a pair of vertical bars 28 connected at the bottom to respective ones of the parallel side members 22 and a cross bar 30 interconnecting the top of the two vertical bars 28.

A first pivot pin 32 is mounted between the side members 22 and normal thereto at about the location of the two gripping members 24 closest to the drum. A pivot arm 34 is pivotally mounted on the first pivot pin 32. Pivot arm 34 terminates on one end above the drum 12 in a yoke generally indicated as 36 comprising a pair of parallel spaced side pieces 38 lying in planes normal to the pivot pin 32.

A second pivot pin 40 is mounted between the side pieces 38 and normal thereto. A pinch roller 42 is mounted on the second pivot pin 40 for rotational movement.

As thus configured, at 44 and 46 are surfaces on the forward side of the supplemental track 20 (where "forward" means closest to the drum and "rear" means furthest from the drum) which are parallel to the longitudinal axis 14 of the drum 12. At 48 and 50, are surfaces on the forward gripping members 24 which lie in planes which are parallel to the two pivot pins 32, 40 and are normal to the side members 22 and side pieces 38. Thus, if surface 44 is held against surface 48 and/or surface 46 is held against surface 50, the pinch roller 42 will be placed in the desired positional alignment with its longitudinal axis 52 in exact parallel alignment with the longitudinal axis 14 of the drum as required for proper operation.

To effect an automatic positional alignment thus, a pair of leaf springs 54 are mounted to the rearward gripping members 24 as with screws 56. Leaf springs 54 extend outward along the rear surface 58 of the supplemental track 20 pushing thereagainst and thereby urging the surfaces 44, 46 towards the surfaces 48, 50. The urging force of the leaf springs 54 is sufficient to pull the side members 22 towards a position of contact between the surfaces 44, 48 and/or 46, 50 but with insufficient force to cause binding or an excess of friction whereby the pinch roller assembly 18 is easily slid along the supplemental track 20 for positioning the pinch roller 42 along the length of the drum 12.

The foregoing attributes of the present invention provide for the easy adjustment and self-alignment features. The pinching, locking, and release features necessary to fully accomplish the objective will now be discussed.

Figure 3:
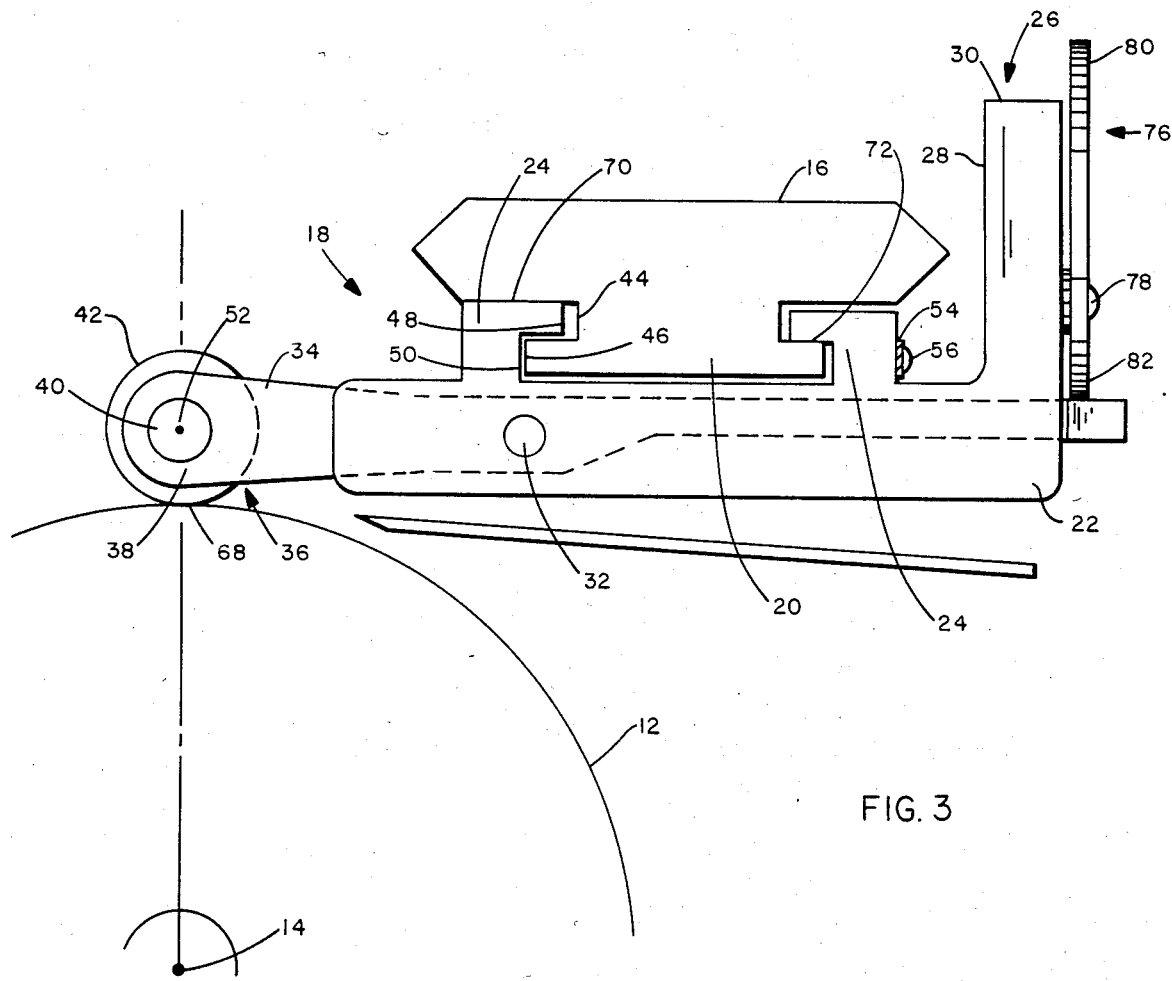
FIG. 3 is a side view of the pinch roller of the present invention in its down and locked position.

The rear portion of the pivot arm 34 extends in part to a point below the cross bar 30. A coil spring 60 is connected between a pin 62 extending from the rear of pivot arm 34 to a pin 64 extending from the cross bar 30. Coil spring 60 is extended to fit over pins 62, 64 whereby an upward force is exerted on the rear of the pivot arm 34 by spring 60 as indicated by arrow 66. The result is a gripping or pinching force of the L-shaped gripping members 24 on the supplemental track 20 in the manner shown n FIG. 3. As the spring 60 creates upward force 66 at the back of the pivot arm 34, the pinch roller 42 is moved downward to contact the surface of the drum 12 at 68 as the pivot arm 34 is rotated counterclockwise about the first pivot pin 32 as FIG. 3 is viewed. Once the pinch roller 42 contacts the surface of the drum 12 at point 68, force 66 is translated into a counterclockwise movement of the parallel side members 22 about the longitudinal axis 52 of the pinch roller 42 until such time as the gripping members 24 closest to the pinch roller 42 contact the bottom of the carriage track 16 at 70. Thereafter, the force 66 is translated into a clockwise motion of the side members 22 about contact point 70 until such time as the gripping members 24 furthest from the pinch roller 42 contact the supplemental track 20 at 72. Thereafter, the force 66 is translated into a gripping motion of the members 24 onto the tracks 16, 20 by pressure against contact point 70, 72. This gripping or pinching action is sufficient to maintain the pinch roller assembly 18 in its position with respect to the drum 12.

Figure 1:
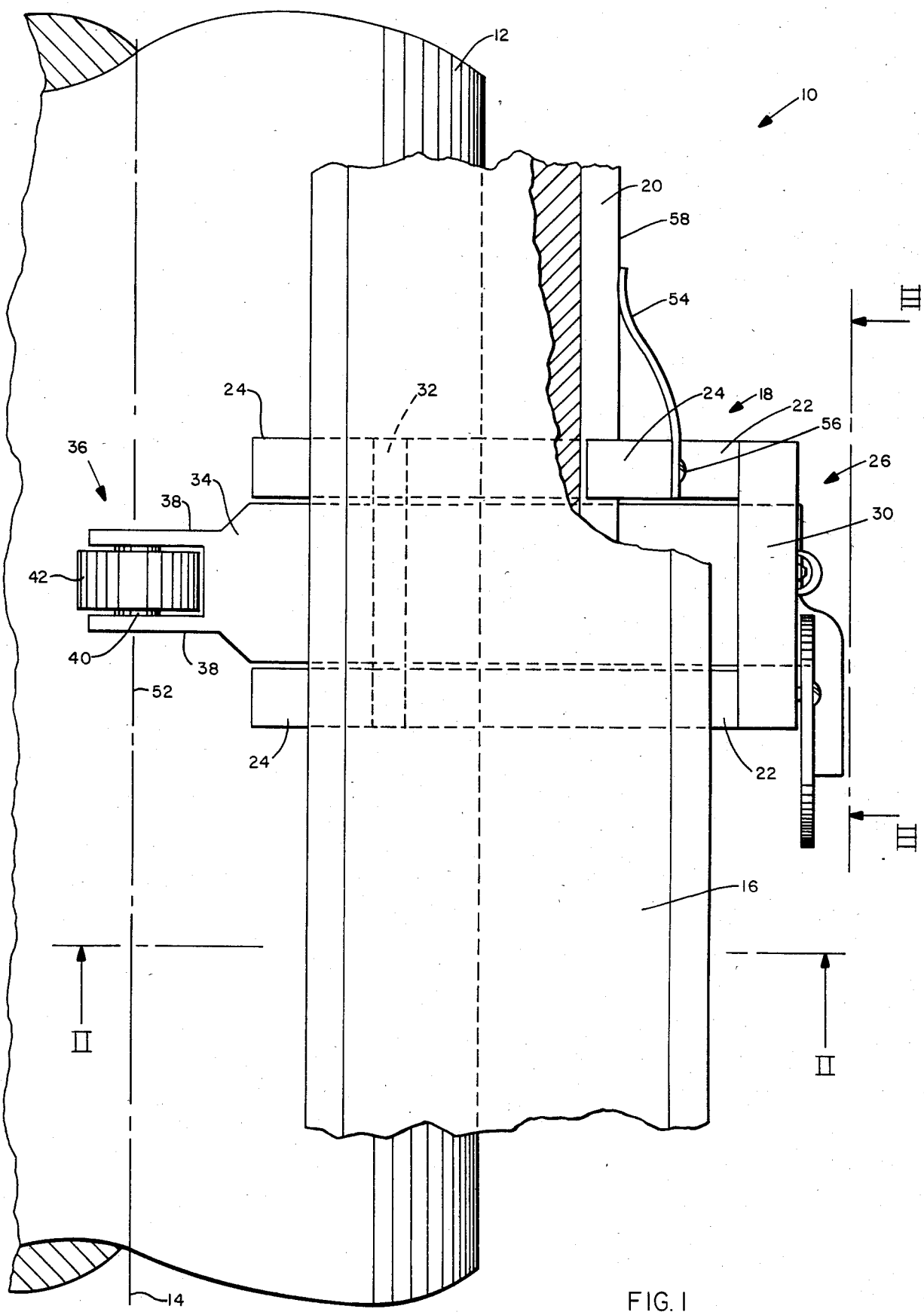
FIG. 1 is a partially cutaway plan view of the pinch roller carriage assembly of the present invention.
Figure 2:
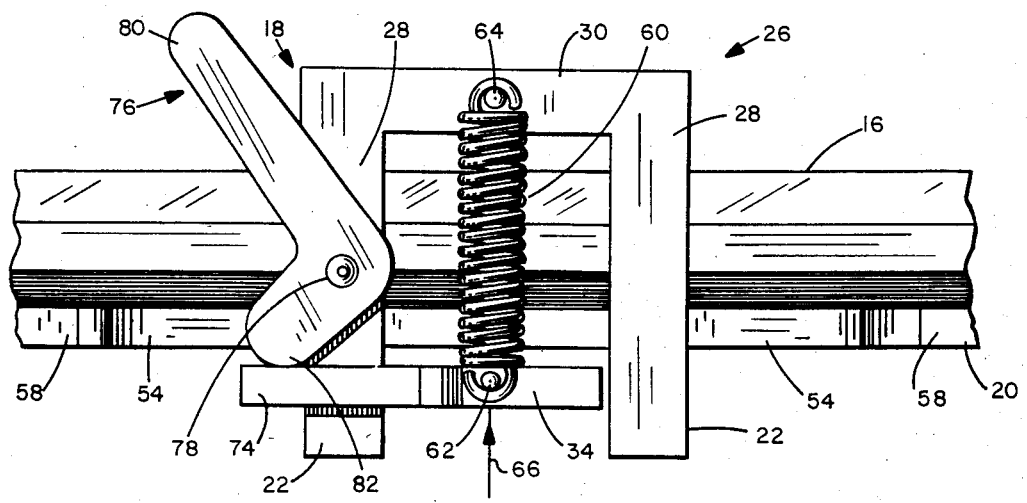
FIG. 2 is a rear elevation view of the pinch roller assembly of the present invention in its down and locked position.
Figure 4:
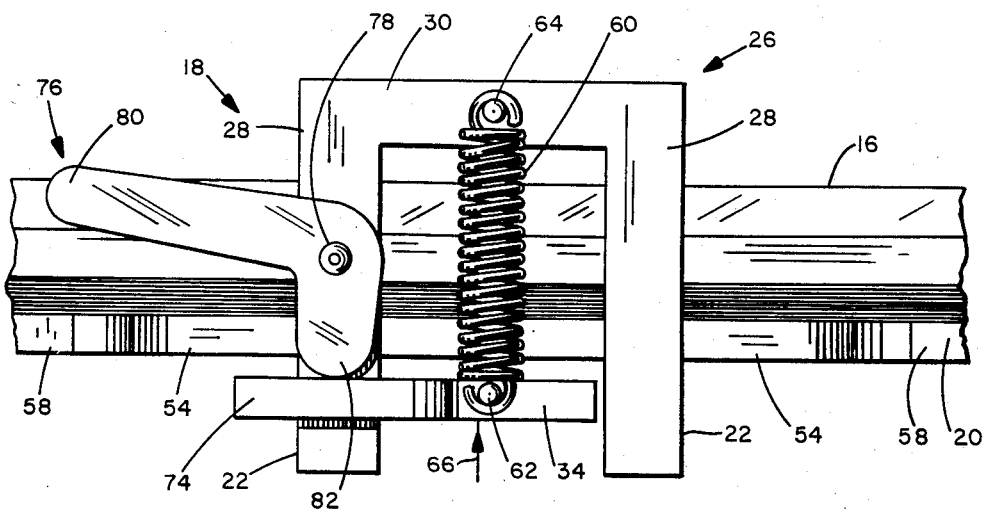
FIG. 4 is a rear elevation view showing the pinch roller assembly of the present invention in its released position.

To allow the pinch roller assembly 18 to be adjusted, arm 74 extends out from the other portion of the back of the pivot arm 34 and beneath one of the vertical bars 28 of the U-shaped member 26. Pressure release arm 76 is pivotally mounted at 78 to that vertical bar 28. Pressure release arm 76 comprises an upper portion 80 adapted to be hand rotated by the plotter operating personnel and a lower portion 82 adapted to contact the arm 74 and hold it against the bias pressure of spring 60. In its released position of FIG. 2, the lower portion 82 is touching the arm 74 but is not holding it against the pressure of spring 60 whereby the gripping action as above-described is in effect. As shown in FIGS. 4 and 5, however, the upper portion 80 has been rotated to put the point of contact with arm 74 of the lower portion 82 in alignment with the pivot point 78 such that the pinch roller 42 is lifted slightly from the drum 12, the gripping force is released, and the rear of the pivot arm 34 is propped against the upward biasing force 66 of spring 60. Accordingly, the previously described clearance is in effect between the gripping members 24 and supplemental track 20 whereby the pinch roller assembly 18 can be slid along the supplemental track 20 for adjustment purposes.

Wherefore, having thus described my invention, I claim:

1. In a graphics plotter having a rotatable drum, a pinch roller for holding a writing medium against the surface of the drum for longitudinal movement thereby, and a carriage track disposed above and parallel to the drum for supporting a pen block carriage for traverse movement, the improvement comprising:

(a) a supplemental track carried by the carriage track and extending downward therefrom, said supplemental track being an inverted T-shape in cross section;

(b) a pinch roller carriage having a pair of spaced parallel side members, each having a pair of facing L-shaped gripping members extending upward therefrom, said gripping members being adapted to fit loosely about said supplemental track whereby said pinch roller carriage hangs therefrom and is easily slideable traversely along said supplemental track;

(c) a first pivot pin disposed between said side members and normal thereto at about the location of the ones of said gripping members closest to the drum;

(d) a pivot arm pivotally mounted on said first pivot pin and extending between said side members, one end of said pivot arm terminating above the drum in a yoke having a pair of parallel spaced side pieces lying in planes normal to said pivot pin, the other end of said pivot arm extending past the portion of said supplemental track furthest from the drum;

(e) a second pivot pin disposed between said side pieces and normal thereto;

(f) a pinch roller mounted on said second pivot pin for rotational movement;

(g) first bias means carried by said pinch roller carriage for pushing against said supplemental track to urge said gripping members closest to said drum against the edge of said supplemental track closest to the drum whereby said second pivot pin is placed in longitudinally parallel alignment with the longitudinal axis of the drum, said urging being with a force sufficiently small to allow the easy translational sliding of said pinch roller carriage along said supplemental track;

(h) second bias means operably connected between said pinch roller carriage and said pivot arm for urging said pinch roller down against the surface of the drum and said gripping members into pinching engagement with said supplemental track with sufficient force to prevent translational movement of said pinch roller carriage; and, (i) bias release means for selectively holding said pinch roller off said drum and releasing said pinching engagement against the force of said second bias means to allow translational movement of said pinch roller carriage and thereby the position of said pinch roller along the length of the drum.

2. In a graphics plotter having a rotatable drum, a pinch roller for holding a writing medium against the surface of the drum for longitudinal movement thereby, and a carriage track disposed above and parallel to the drum for supporting a pen block carriage for traverse movement, the improvement comprising:

(a) a supplemental track carried by the carriage track and extending downward therefrom, said supplemental track being an inverted T-shape in cross section;

(b) a pinch roller carriage having a pair of spaced parallel side members, each having a pair of facing gripping members extending upward therefrom to form a groove of T-shaped cross section, said gripping members being adapted to fit loosely about said supplemental track with said track disposed within said groove whereby said pinch roller carriage hangs from said supplemental track and is easily slideable along said supplemental track;

(c) a first pivot pin disposed between said side members and normal thereto at about the location of the edge of said groove closest to the drum;

(d) a pivot arm pivotally mounted on said first pivot pin and extending between said side members, one end of said pivot arm terminating above the drum in a yoke having a pair of parallel spaced side pieces lying in planes normal to said pivot pin, the other end of said pivot arm extending past the portion of said supplemental track furthest from the drum;

(e) a second pivot pin disposed between said side pieces and normal thereto;

(f) a pinch roller mounted on said second pivot pin for rotational movement;

(g) first bias means carried by said pinch roller carriage for pushing against said supplemental track to urge said gripping members closest to said drum against the edge of said supplemental track closest to the drum whereby said second pivot pin is placed in longitudinally parallel alignment with the longitudinal axis of the drum, said urging being with a force sufficiently small to allow the easy translational sliding of said pinch roller carriage along said supplemental track;

(h) second bias means operably connected between said pinch roller carriage and said pivot arm for urging said pinch roller down against the surface of the drum and said groove formed by said gripping members into pinching engagement with said supplemental track with sufficient force to prevent translational movement of said pinch roller carriage; and, (i) bias release means for selectively holding said pinch roller off said drum and releasing said pinching engagement against the force of said second bias means to allow translational movement of said pinch roller carriage and thereby the position of said pinch roller along the length of the drum.

3. In a graphics plotter having a rotatable drum, a pinch roller for holding a writing medium against the surface of the drum for longitudinal movement thereby, and a carriage track disposed above and parallel to the drum for supporting a pen block carriage for traverse movement, the improvement comprising:

(a) a supplemental track carried by the carriage track and extending downward therefrom;

(b) a pinch roller carriage having a pair of spaced parallel side members, each having a pair of gripping members extending upward therefrom, said gripping members being adapted to mate with said supplemental track whereby said pinch roller carriage is suspended from said supplemental track and is easily slideable traversely along said supplemental track;

(c) a first pivot pin disposed between said side members and normal thereto at about the location of the ones of said gripping members closest to the drum;

(d) a pivot arm pivotally mounted on said first pivot pin and extending between said side members, one end of said pivot arm terminating above the drum in a yoke having a pair of parallel spaced side pieces lying in planes normal to said pivot pin, the other end of said pivot arm extending past the portion of said supplemental track furthest from the drum;

(e) a second pivot pin disposed between said side pieces and normal thereto;

(f) a pinch roller mounted on said second pivot pin for rotational movement;

(g) first bias means carried by said pinch roller carriage for pushing against said supplemental track to urge said gripping members closest to said drum against the edge of said supplemental track closest to the drum whereby said second pivot pin is placed in longitudinally parallel alignment with the longitudinal axis of the drum, said urging being with a force sufficiently small to allow the easy translational sliding of said pinch roller carriage along said supplemental track;

(h) second bias means operably connected between said pinch roller carriage and said pivot arm for urging said pinch roller down against the surface of the drum and said gripping members into gripping engagement with said supplemental track with sufficient force to prevent translational movement of said pinch roller carriage; and, (i) bias release means for selectively holding said pinch roller off said drum and releasing said pinching engagement against the force of said second bias means to allow translational movement of said pinch roller carriage and thereby the position of said pinch roller along the length of the drum.

4. The improvement of claim 3 wherein:
(a) said supplemental track is shaped as an inverted T in cross section; and,
(b) said gripping members are L-shaped in cross section and create a pair of parallel T-shaped grooves in which said T-shaped supplemental track is disposed.

5. The improvement of claim 4 wherein:
said first bias means comprises a pair of leaf springs carried by said pinch roller carriage in sliding relationship with and pushing against the rearmost surface of said T-shaped supplemental track.

* * * * *